(12) United States Patent
Hennig et al.

(10) Patent No.: US 11,007,990 B2
(45) Date of Patent: May 18, 2021

(54) VALVE OF A PISTON PUMP HAVING A TWO-PART CLOSING BODY

(71) Applicant: Robert Bosch GmbH, Stuttgart (DE)

(72) Inventors: Oliver Hennig, Obersulm (DE); Patrick Schellnegger, Ludwigsburg (DE); Oliver Gaertner, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 478 days.

(21) Appl. No.: 14/747,449

(22) Filed: Jun. 23, 2015

(65) Prior Publication Data
US 2015/0375722 A1 Dec. 31, 2015

(30) Foreign Application Priority Data

Jun. 27, 2014 (DE) .................... 10 2014 212 501.4

(51) Int. Cl.
*B60T 8/40* (2006.01)
*F04B 53/12* (2006.01)
*B60T 8/34* (2006.01)
*F04B 53/10* (2006.01)

(52) U.S. Cl.
CPC ............ *B60T 8/4031* (2013.01); *B60T 8/341* (2013.01); *F04B 53/10* (2013.01); *F04B 53/125* (2013.01); *Y10T 137/7929* (2015.04)

(58) Field of Classification Search
CPC ........ B60T 8/4031; B60T 8/341; F04B 53/10; F04B 53/125; F16K 1/30; F16K 31/12; Y10T 137/7929; Y10T 137/7841; Y10T 137/7783; Y10T 137/7743; Y10T 137/7847; Y10T 137/7849; Y10T 137/7852; Y10T 137/785
See application file for complete search history.

(56) References Cited

U.S. PATENT DOCUMENTS

| 3,227,051 | A | * | 1/1966 | Hein ..................... E02F 3/6481 91/438 |
| 4,190,076 | A | * | 2/1980 | Cameron ................. F16K 47/00 137/505.45 |
| 4,418,548 | A | * | 12/1983 | Sawyer ................... F04B 41/00 137/513.7 |
| 5,186,021 | A | * | 2/1993 | Keller ..................... F25B 41/06 137/513.3 |

(Continued)

FOREIGN PATENT DOCUMENTS

| CN | 1107936 A | 9/1995 |
| CN | 103080552 A | 5/2013 |
| DE | 10 2010 039 501 A1 | 2/2012 |

*Primary Examiner* — Craig M Schneider
*Assistant Examiner* — Frederick D Soski
(74) *Attorney, Agent, or Firm* — Maginot, Moore & Beck LLP

(57) ABSTRACT

A valve of a piston pump for a vehicle brake system having a closing body which is resiliently preloaded against a sealing seat. The closing body is formed in two parts with a damping piston and a closing element inserted therein. The damping piston is axially displaceably guided in a cylindrical piston guide. At least one flow channel is provided between the damping piston and the piston guide. The at least one flow channel is configured such that fluid can flow around the damping piston in the longitudinal direction thereof through the at least one flow channel.

8 Claims, 4 Drawing Sheets

(56) References Cited

U.S. PATENT DOCUMENTS

| | | | | |
|---|---|---|---|---|
| 5,433,135 | A | * | 7/1995 | Watanabe ............... B60T 13/57 91/376 R |
| 5,660,534 | A | * | 8/1997 | Snow .................... F04B 53/125 417/554 |
| 5,685,333 | A | * | 11/1997 | Skaryd ................. F16K 15/063 137/514 |
| 5,833,210 | A | * | 11/1998 | Sommer ................ B30B 15/10 251/61.4 |
| 2003/0196703 | A1 | * | 10/2003 | DeCler ................ F16K 15/026 137/538 |
| 2004/0000341 | A1 | * | 1/2004 | Kim ........................ F16K 17/08 137/513.3 |
| 2006/0112995 | A1 | * | 6/2006 | Kwon .................... B60T 8/341 137/540 |
| 2006/0289068 | A1 | * | 12/2006 | Miller, Jr. ............ F16K 15/026 137/513.3 |
| 2011/0126924 | A1 | * | 6/2011 | Goh ........................ F04B 39/10 137/540 |
| 2013/0240773 | A1 | * | 9/2013 | Zimmermann ..... F04B 53/1017 251/318 |

\* cited by examiner

VALVE OF A PISTON PUMP HAVING A TWO-PART CLOSING BODY

This application claims priority under 35 U.S.C. § 119 to patent application number DE 10 2014 212 501.4, filed on Jun. 27, 2014 in Germany, the disclosure of which is incorporated herein by reference in its entirety.

BACKGROUND

The disclosure relates to a valve of a piston pump, in particular for a hydraulic vehicle brake system, having a closing body which is resiliently preloaded against a sealing seat, and in which the closing body is formed in two parts with a damping piston and a closing element inserted therein, wherein the damping piston is axially displaceably guided in a cylindrical piston guide. The disclosure further relates to a use of such a valve according to the disclosure on a piston pump of a vehicle brake system.

A valve of the type in question is known from DE 10 2010 039 501 A1. In such a valve, the spring-loaded valve body or closing body is configured in two parts for selectively closing an associated valve opening. Here, in particular a damping piston as one part of the two-part closing body is guided in a cylindrical piston guide. The two-part closing body affords a particularly favorable construction in terms of assembly which furthermore is also particularly well suited to compensating for manufacturing size tolerances and for achieving the leak tightness required over the service life. There results a favorable assembly sequence for the components to be assembled which can be achieved in a readily automatable manner with a displaceable work piece carrier.

SUMMARY

According to the disclosure there is provided a valve of a piston pump, in particular for a hydraulic vehicle brake system, having a closing body which is resiliently preloaded against a sealing seat, and in which the closing body is formed in two parts with a damping piston and a closing element inserted therein, wherein the damping piston is axially displaceably guided in a cylindrical piston guide. Here, there is provided between the damping piston and the piston guide at least one flow channel through which fluid can flow around the damping piston in the longitudinal direction thereof.

The essence of the disclosure lies in a modified geometry at the contact region between a piston guide and a damping piston of a two-part closing body. According to the disclosure, at least one flow of fluid around the damping piston is provided at this contact region. This encircling flow of fluid makes it possible to positively influence the damping behavior of the damping piston. In particular, this solution according to the disclosure makes it possible for the closing body to be configured to be quicker to react and to be less inert. The solution according to the disclosure further makes it possible for the damping piston and, with this, the closing body to be centered on the associated valve opening. At the same time, excessive hydraulic damping of the damping piston can be prevented by means of the encircling flow according to the disclosure. The disclosure can be implemented in a substantially cost-neutral manner. It allows overall lower internal pressures in the associated cylinder of the piston pump and improves the efficiency of the associated valve assembly or valve arrangement. Thus, according to the disclosure, it is also possible to use smaller drive motors with identical pump capacity.

The at least one flow channel is preferably formed as a cutout in the damping piston. Such a development can be produced in particular in a cost-usual manner on an injection-molded damping piston. In this case, the cutout is particularly preferably configured as a radially directed slot in the damping piston. With particular preference, in total three or four cutouts are arranged spaced apart with identical spacings on the circumference of the damping piston or are provided in a uniformly distributed manner over the circumference of the damping piston. The damping piston is thereby afforded a type of cloverleaf shape in a plan view of its end side or when viewed in cross section.

Alternatively or in addition, the at least one flow channel is formed as a cutout in the piston guide. A conventional damping piston closed completely at the circumference can be used as a damping piston for this configuration. The cutout is advantageously configured as a radially directed groove in the piston guide. Such a groove can be produced very favorably by means of milling in the piston guide, which is generally a valve cover or a pump cover.

With particular preference, in total four to ten, preferably eight, cutouts are provided in a uniformly distributed manner over the circumference of the piston guide.

The closing element is preferably formed with a head bearing on an end side of the damping piston and with a shaft plugged into the damping piston. The head is preferably configured with a spherical cap shape and/or the shaft has a cylindrical configuration. The closing element configured in such a way with a mushroom shape can be mounted in a particularly readily automatable manner by its shaft to be plugged into the damping piston, in particular on a displaceable work piece carrier.

In the closing element, in particular in its head, a central depression is preferably formed on the end side facing the sealing seat. The central depression forms a concave region on the end side of the closing element that faces the fluid flowing toward the valve. This concave region produces a build-up effect for the inflowing fluid and leads to a particularly good opening behavior of the valve.

The closing element is preferably retained on the damping piston by means of a latching arrangement, in particular in the form of at least one catch formed on the shaft. The shaft of this type can be mounted on the damping piston and fastened there by simple plugging-in or insertion and latching or catching. The at least one catch is preferably configured as a shoulder, clip or stud.

According to the disclosure, the closing element is also held on the damping piston with radial play which is produced in particular by a radial distance between the shaft and the surrounding damping piston. In this configuration according to the disclosure, in particular the diameter of the then circular cylindrical shaft is configured to be slightly smaller than the diameter of a then circular cylindrical opening, which is formed in the damping piston, for receiving and retaining the shaft. The radial play provided in this way allows the closing element to move slightly radially in the damping piston and thus in particular to slide with its head along the end side of the damping piston. This radial movement allows the closing element to be able to bear on the associated valve seat with its full surface without any undesired offset of the closing element relative to the valve seat being able to occur here.

At the end side of the damping piston that faces the closing element there is preferably formed at least one channel through which it is possible for fluid to flow below the closing element, this flow being directed radially inwardly from outside. Fluid which has entered through the opening of the valve seat can pass through the channel into the damping piston, to the rear side of the head and also to the rear side of the damping piston. This fluid can be used for targeted damping of the movement of the damping piston. The channel preferably forms a portion of a flow connection through the damping piston to its other end side. In the flow direction behind said channel, the remainder of the flow connection is advantageously formed by means of a central through-opening in the damping piston into which the mushroom-shaped closing element is then also inserted with play by means of its shaft. A constriction is advantageously formed in the channel, forming a throttle. The throttle results in the fact that the outflow of fluid into the interior of the damping piston and to its rear side can be retarded or backed up in a targeted manner. It is possible in this way to achieve in a targeted manner a greater damping effect of the damping piston in view of obtaining a lower vibrational behavior of the associated closing element. The channel is preferably formed by means of a radially directed groove which is formed in the damping piston and whose opening cross section is reduced at a point in the axial direction. This configuration of the channel with the associated throttle can be produced in a particularly cost-effective manner by means of a simple milling operation.

The disclosure is also directed to a use of such a valve according to the disclosure on a piston pump of a vehicle brake system.

BRIEF DESCRIPTION OF THE DRAWINGS

The solution according to the disclosure will be explained in more detail below by way of example with reference to the appended schematic drawings, in which.

DETAILED DESCRIPTION

Figure 1:
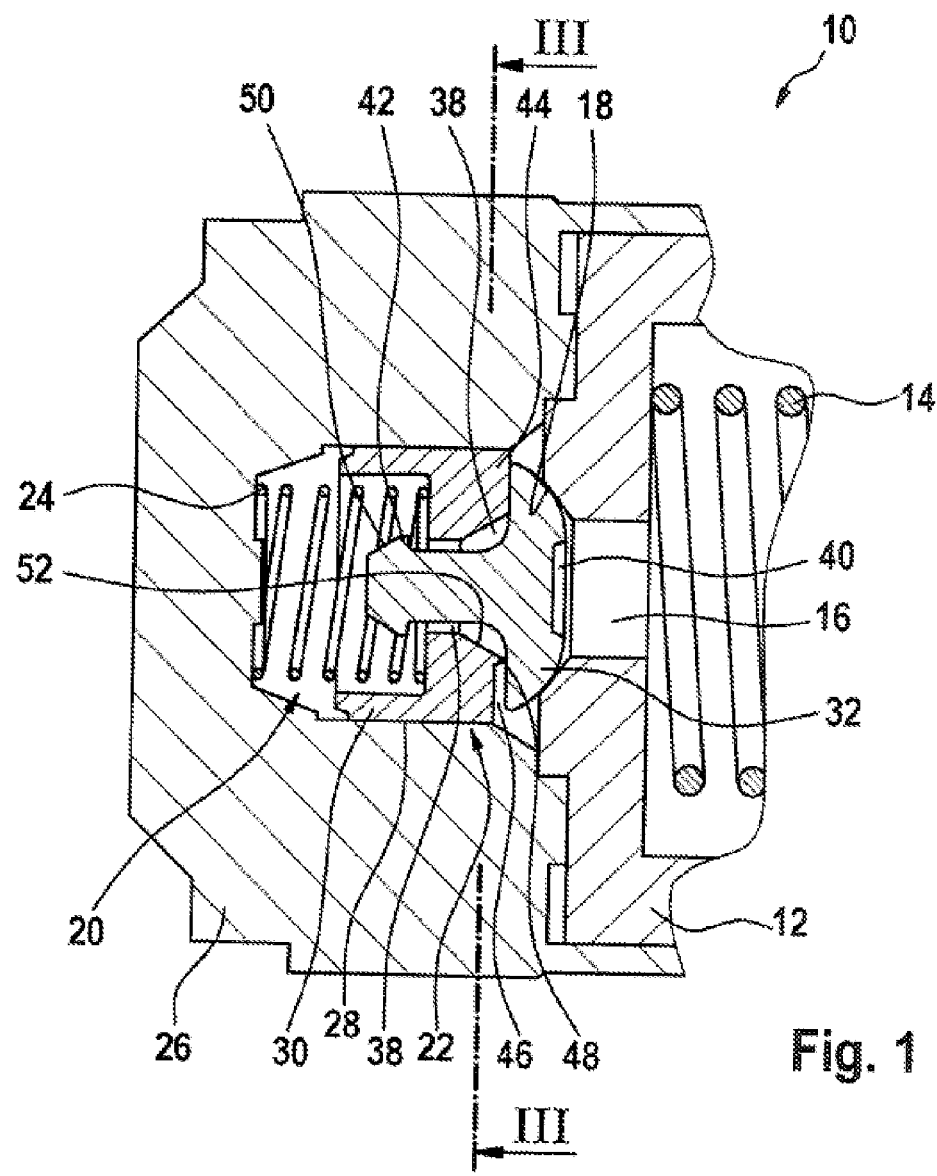
FIG. 1 shows a partial longitudinal section of a first exemplary embodiment of a piston pump according to the disclosure.
Figure 2:
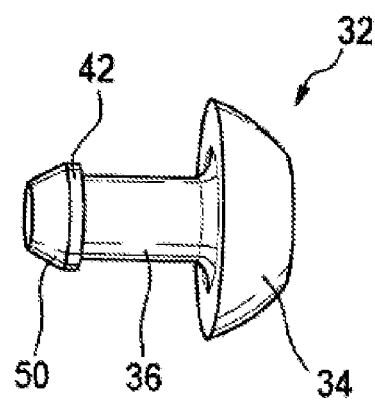
FIG. 2 shows a perspective view of the closing body according to FIG. 1.
Figure 3:
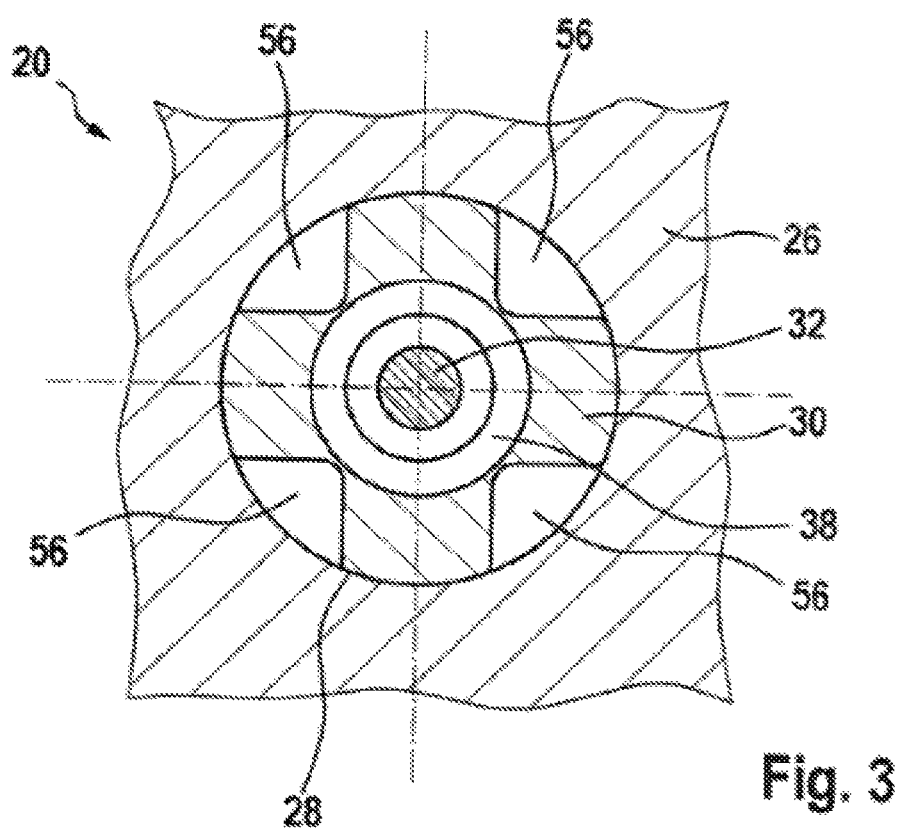
FIG. 3 shows the section III-III according to FIG. 1.

FIGS. 1 to 3 illustrate a first piston pump 10 for a hydraulic vehicle brake system (not shown further) which serves to produce a fluid pressure for brake fluid within the vehicle brake system. For this purpose, the piston pump 10 has a cup-shaped cylinder 12 in which a piston (not shown) is displaceably mounted against a helical spring 14. The piston delivers brake fluid through a circular outflow opening 16 formed in the bottom region of the cylinder 12. The outflow opening 16 is surrounded by a valve seat or sealing seat 18 which is part of an outlet valve 20. A helical spring 24 is supported on a pump cover 26 which encloses the cylinder 12 at the end side. A cylindrical piston guide 28 is formed by the pump cover 26. The helical spring 24 presses a two-part closing body 22 against the sealing seat 18. The closing body 22 comprises a damping piston 30 and a mushroom-shaped closing element 32 inserted therein. The damping piston 30 is guided by the piston guide 28. A construction is provided in this way by means of which it is possible to compensate for manufacturing size tolerances in particular between the sealing seat 18 and the closing body 22 in the radial direction. In this case, the closing element 32 bears by its shaft-side end face on the end side of the damping piston 30 and is slightly radially movable. The closing element 32 comprises a bearing head 34 and a shaft 36 which is plugged into the damping piston 30 and protrudes therein.

The closing element 32 has been plugged by its shaft 36 into a central through-opening 38 formed in the damping piston 30 and has a central depression 40 on its head 34 at the end side facing the sealing seat 18. This central depression 40 produces a build-up effect for the inflowing fluid and leads to an improved opening behavior of the outlet valve 20.

The closing element 32 is retained on the damping piston 30 by means of a latching arrangement which, in the exemplary embodiment represented in FIGS. 1 to 3, is formed by a peripheral shoulder 42 formed on the free end of the shaft 36. The diameter of the shoulder 42 is slightly larger than the diameter of the through-opening 38. The remainder of the shaft 36 has a slightly smaller diameter than the through-opening 38. In this way, the closing element 32 is held on the damping piston 30 with radial play, this being ensured in particular by the then radial distance between the shaft 36 and the damping piston 30 surrounding it.

On the end side 44 of the damping piston 30 that faces the closing element 32 there is formed a radially oriented channel 46 through which fluid can flow through below the head 34 into the interior of the damping piston 30 and to its rear side. This fluid contributes to a damping, which can be set in a targeted manner at different operating pressures, of the movement of the damping piston 30. In this case, the damping piston 30 is likewise resiliently preloaded by means of a helical spring 24 at its rear side, said spring being supported on a pump cover 26.

A constriction 48 is formed in the channel 46, forming a throttle. This throttle retards the outflow of fluid into the interior of the damping piston 30 in a targeted manner.

In order to insert the closing element 32 by means of its shaft 36 into the through-opening 38, a phase 50 or 52 is formed both on the free end of the shaft 36 and on the end-side edge of the through-opening 38.

As is represented in FIG. 3, there are provided between the damping piston 30 and the piston guide 28 four flow channels 56 through which fluid can flow around the damping piston 30 in the longitudinal direction thereof. The flow channels are configured in each case as a cutout or as a radially directed slot in the damping piston 30. These slots make it possible for fluid which flows out of the outlet valve 20 to flow around the damping piston 30, with the result that its damping behavior can be influenced in a targeted manner.

Figure 4:
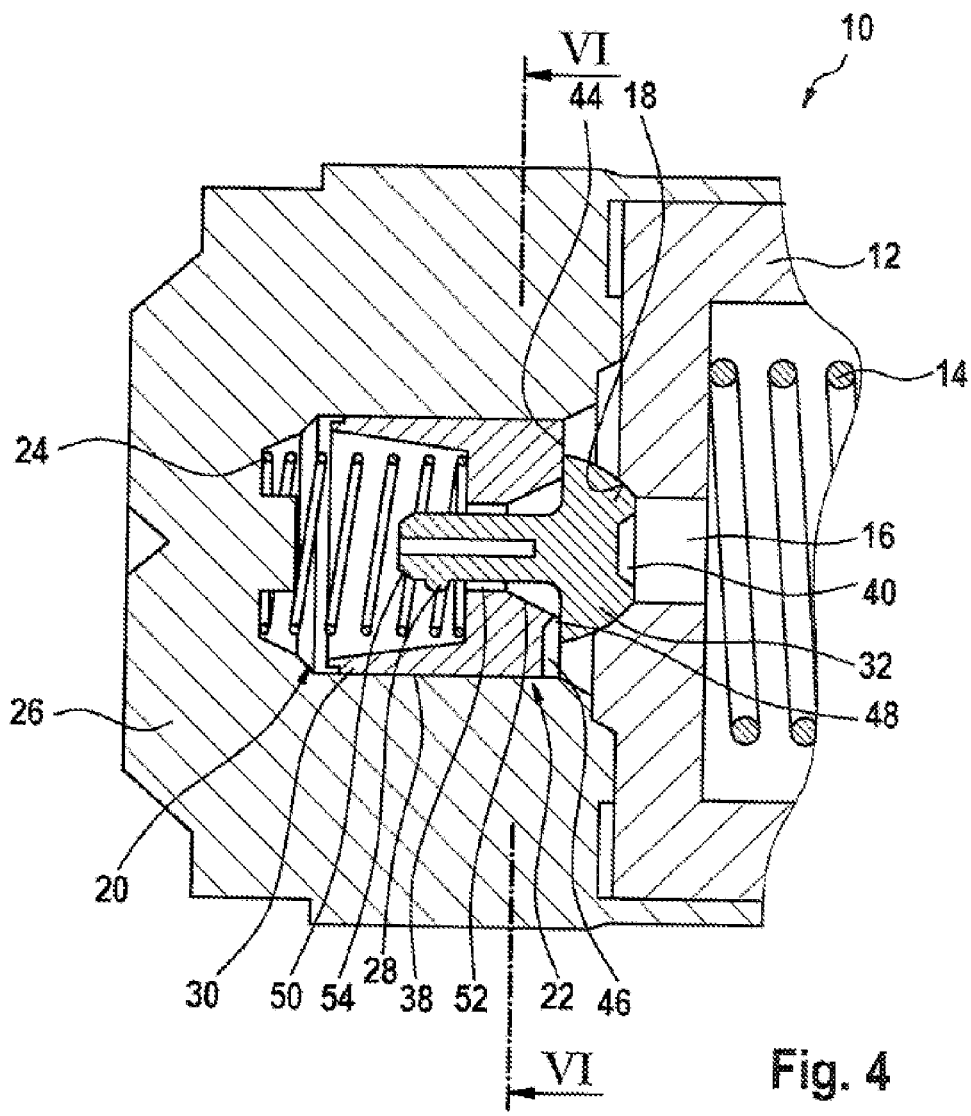
FIG. 4 shows the longitudinal section according to FIG. 1 of a second exemplary embodiment of a piston pump according to the disclosure.
Figure 5:
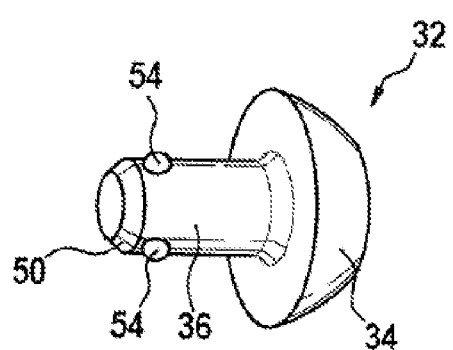
FIG. 5 shows a perspective view of the closing body according to FIG. 4.
Figure 6:
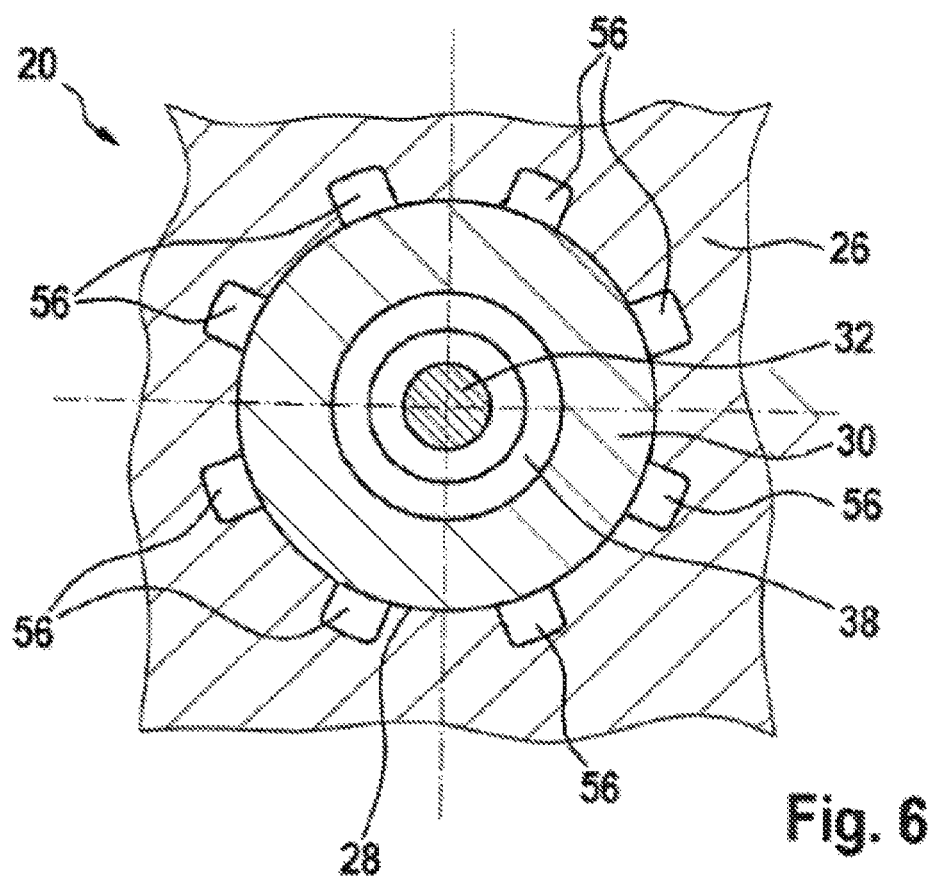
FIG. 6 shows the section VI-VI according to FIG. 4.

FIGS. 4 to 6 illustrate an exemplary embodiment of a two-part closing body 22 according to the disclosure in which the latching arrangement between the damping piston 30 and the mushroom-shaped closing element 32 is produced by means of studs 54. The studs 54 are situated in a distributed manner at regular distances over the circumference of the associated shaft 36 at the location where the shoulder 42 is formed in the exemplary embodiment according to FIGS. 1 to 3.

Furthermore, in the exemplary embodiment according to FIGS. 4 to 6, eight flow channels 56 allowing fluid to flow around the damping piston 30 in the longitudinal direction thereof are provided. The flow channels 56 are in each case configured as a cutout or as a radially outwardly directed groove in the piston guide 28 that extends in the longitudinal direction. Here, the in total eight grooves are arranged spaced apart in a uniformly distributed manner over the inner circumference of the piston guide 28.

What is claimed is:

1. A valve of a piston pump for a vehicle brake system, the valve comprising:
   a cylinder having a circular outflow opening at a first end thereof, the outflow opening being surrounded by a sealing seat;
   a pump cover which encloses the first end, the pump cover forming a cylindrical piston guide;
   a closing body resiliently preloaded against the sealing seat, the closing body formed in two parts with a damping piston and a closing element inserted in the damping piston,
   wherein the damping piston is axially displaceably guided in the cylindrical piston guide,
   wherein at least one flow channel is provided between an outer circumferential surface of the damping piston and the piston guide, and
   wherein the at least one flow channel is configured to enable fluid to flow around the damping piston in a longitudinal direction of the damping piston through the at least one flow channel.

2. The valve according to claim 1, wherein the at least one flow channel is a cutout in the damping piston.

3. The valve according to claim 2, wherein the cutout is a radially directed slot in the damping piston.

4. The valve according to claim 2, wherein the cutout includes four cutouts provided in a uniformly distributed manner over a circumference of the damping piston.

5. The valve according to claim 1, wherein the at least one flow channel is a cutout in the piston guide.

6. The valve according to claim 5, wherein the cutout is a radially directed groove in the piston guide.

7. The valve according to claim 5, wherein the cutout includes four cutouts provided in a uniformly distributed manner over a circumference of the piston guide.

8. The valve according to claim 1, wherein the valve is configured for use on a piston pump of a hydraulic vehicle brake system.

* * * * *